United States Patent [19]
Chaisemartin

[11] Patent Number: 5,903,619
[45] Date of Patent: *May 11, 1999

[54] METHOD AND APPARATUS FOR DETECTING A BINARY PATTERN IN A SERIAL TRANSMISSION

[75] Inventor: Philippe Chaisemartin, Sainte Agnes, France

[73] Assignee: SGS-Thomson Microelectronics S.A., Saint Genis, France

[*] Notice: This patent is subject to a terminal disclaimer.

[21] Appl. No.: 08/915,856

[22] Filed: Aug. 21, 1997

Related U.S. Application Data

[63] Continuation of application No. 08/422,495, Apr. 12, 1995.

[30] Foreign Application Priority Data

Apr. 12, 1994 [FR] France .................................. 94/04669

[51] Int. Cl.$^6$ ...................................................... H04L 7/00
[52] U.S. Cl. ......................... 375/366; 370/510; 370/514; 375/368
[58] Field of Search .................................... 375/354, 362, 375/365, 366, 368; 370/503, 510, 514

[56] References Cited

U.S. PATENT DOCUMENTS

| 4,594,728 | 6/1986 | Niguel et al. | 375/116 |
| 4,847,877 | 7/1989 | Bessevre | 375/116 |
| 5,539,751 | 7/1996 | Sabel | 375/368 |
| 5,550,833 | 8/1996 | Fujisawa | 375/368 |
| 5,574,896 | 11/1996 | Li et al. | 375/368 |
| 5,590,159 | 12/1996 | Anderson | 375/368 |
| 5,742,647 | 4/1998 | Chaisemartin | 375/366 |

FOREIGN PATENT DOCUMENTS

| A-3226844 | 2/1983 | Germany | G06F 7/02 |
| A-3623910 | 1/1988 | Germany | H04L 5/22 |
| 2 104 264 | 3/1983 | United Kingdom | H04Q 7/00 |

OTHER PUBLICATIONS

French Search Report from French Application No. 94 94669.
Patent Abstract of Japan, vol. 5, No. 66 (E–55)(738) May 2, 1981 & JP–A–56017540 (Nippon Denki).

Primary Examiner—Chi H. Pham
Assistant Examiner—Bryan Webster
Attorney, Agent, or Firm—Wolf, Greenfield & Sacks P.C.

[57] ABSTRACT

A method is provided for detecting a synchronization word in frames of serially transmitted data. The synchronization word consists of l synchronization bits, which are transmitted one bit per frame at a known position in each frame. The method comprises the steps of: storing each incoming bit in a memory organized as groups of words, each having at least l bits, so that each group of words contains bits from a same position in consecutive frames; rotating each group of words; comparing the group of words, at each rotation, to the synchronization word.

6 Claims, 6 Drawing Sheets

1

METHOD AND APPARATUS FOR DETECTING A BINARY PATTERN IN A SERIAL TRANSMISSION

This application is a continuation of application Ser. No. 08/422,495, filed Apr. 12, 1995, entitled METHOD AND APPARATUS FOR DETECTING A BINARY PATTERN IN A SERIAL TRANSMISSION and now Pending.

BACKGROUND OF THE INVENTION

1. Field of the Invention

The invention relates to the detection of a predetermined pattern in a serial stream of binary data.

2. Discussion of the Related Art

In the field of binary data transmission, data may be serially transmitted one bit at a time along a transmission path. Often the serial data is transmitted by frames which are delimited by codes used to identify the beginning or end of each frame. Such codes must be identified in the data stream before the significance of the data in the frames can be determined.

More particularly, a standard H261 in the field of transmission of compressed image data over telephone networks determines that such data is to be transmitted in frames of 512 bits. The first bit of each frame is a synchronization bit and the synchronization bits of twenty four consecutive frames constitute a predetermined synchronization word or a cyclical permutation thereof. This twenty four bit word is in fact an eight bit word, repeated three times. A series of eight such consecutive frames is known as a multiframe.

German patent application number 36 23 910 describes a method comprising the steps of storing each incoming bit in a memory comprising groups of words, each group of words having at least l bits, such that each group of words contains bits from a same position in consecutive frames. Each group of words is rotated and compared, at each rotation, to the synchronization word. The method is carried out by a microprocessor to achieve bit by bit writing to the memory, which is complex.

An object of the present invention is to detect, in a simple manner, a synchronization word in a stream of serial data transmitted by frames, the synchronization word comprising several bits, transmitted one bit per frame.

SUMMARY OF THE INVENTION

The invention achieves this object by providing the steps of loading in a shift register the group of words in which incoming bit is to be written over a predetermined bit; rotating the contents of the shift register; when the predetermined bit reaches the input of the shift register, shifting in the incoming bit instead of the predetermined bit; rotating the contents of the shift register until they reach their initial state; comparing the contents of the shift register to the synchronization word at each rotation; and overwriting the group of words which was loaded into the shift register with the contents of the shift register.

In order to simplify the accesses to a dynamic memory, in an embodiment of the invention, each group of words comprises words at consecutive addresses. The memory usually comprises pages, each containing a predetermined number of bit locations, which is not a multiple of the synchronization word length l. The groups of words each comprise l+j bits, wherein l bits are used and j bits are unused, j being selected such that the predetermined number of bit locations is a multiple of l+j.

BRIEF DESCRIPTION OF THE DRAWINGS

Particular preferred, non-limiting embodiments of the invention are described below, with reference to the accompanying drawings, in which.

DETAILED DESCRIPTION

Using the H261 standard as an example, at least eight full frames of bits, being one full multiframe, must be searched for a synchronization word which is constituted by each first bit of the frames of a multiframe. There is a relatively high probability that a multiframe of eight frames of random data contains a bit sequence identical to that of the synchronization word, in a position in the frames other than that of the bits of the synchronization word. In order to reduce this probability, three consecutive multiframes (twenty four frames) are searched for a twenty four bit extended synchronization word, being three times the initial eight bit synchronization word. If, for example, the initial synchronization word were 00011011, the extended synchronization word would be 000110110001101100011011.

Figure 1:
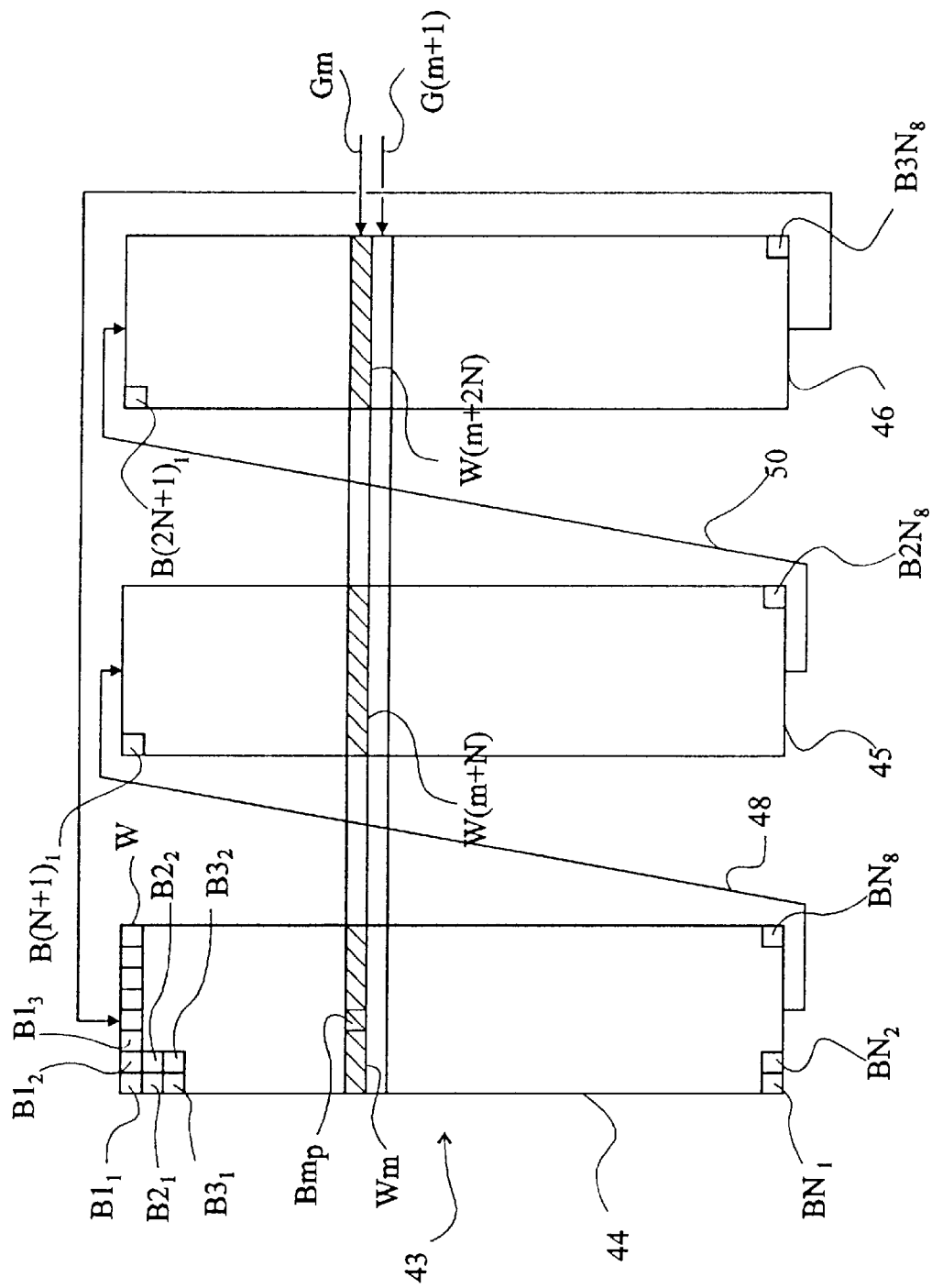
FIG. 1 illustrates the method according to the invention for finding a synchronization word in a serial stream of data.

FIG. 1 shows a layout of a memory area 43 used for simply explaining the method according to the invention. The memory area 43 comprises several blocks of memory 44, 45, 46, each containing a number of words equal to the bit length N of one frame. Preferably, the blocks contain words W of length equal to the number of frames in a multiframe; in the example, words of eight bits. The blocks 44, 45, 46 may be consecutive in memory, as represented by arrows 48, 50.

The first bit of serial data to be received, which is not necessarily the first bit of a frame, is written in the first bit location $B1_1$ of the first word in the memory area 43. The second bit to arrive is written in the first bit location $B2_1$ of the second word, the third bit in the first bit location $B3_1$ of the third word and so on until, after one frame's length of bits has arrived, the first bit location $BN_1$ of the last, Nth, word of the block 44 is filled.

The next bit arriving is written in the second bit location $B1_2$ of the first word. The next two bits are written in locations $B2_2$, $B3_2$, respectively being the second bit locations of the second and third words in the memory area 43.

The 2Nth bit to arrive is written in the second bit location $BN_2$ of the last word in the block 44. The (2N+1)th bit will then be written in the third bit location $B1_3$ of the first word of block 44 of the memory area 43. Similarly, the fourth to eighth bit locations of all words in block 44 are filled, until the 8Nth bit is written in the last bit location $BN_8$ of the last word in the block 44.

The next, (8N+1)th, bit is written in the first bit location $B(N+1)_1$ of the first word of the second block 45 of the memory area 43. The second block then fills, bit by bit in a sequence identical to that for the first block, until the 16Nth bit is written in the last bit location B(2N)$_8$ of the last word in the second memory block 45.

The next, (16N+1)th bit is then written in the first bit location B(2N+1)$_1$ of the third memory block 46. This block fills in a manner identical to that of the first and second blocks, until the 24Nth bit is written in the last bit location B3N$_8$ of the last word in the memory area 43.

The next, (24N+1)th bit is written into bit location B1$_1$, overwriting the first received bit.

In this way, each eight bit word W in the memory area contains bits from the same position in each of eight consecutive frames. The word which contains the first bit of each frame, the synchronization bits, will therefore contain the eight bit synchronization word, or a cyclical permutation thereof. Therefore, the synchronization could be achieved by comparing each memory word to the eight bit synchronization word and to the cyclical permutations thereof.

Similarly, each group of words Gm (where m is an integer from 1 to N), constituted of words Wm, W(m+N), W(m+2N), contains bits from the same position in each of twenty four consecutive frames. One of the groups of words contains the extended, twenty four bit synchronization word, or a cyclical permutation thereof. The synchronization word may reliably be detected by comparing each group of words to the extended synchronization word and to the cyclical permutations thereof.

In order to detect the synchronization word, each group of words Gm is read into a fed-back shift register. The contents of the shift register are then rotated a number of times, equal to the total bit length of the group of words, in this example, twenty four. During such rotation steps, the contents of the shift register are tested for equality with the extended synchronization word.

If the extended synchronization word is detected at any of the rotation steps, the bits contained in the group of words Gm represent the first bits of the respective frames, and synchronization has thus been achieved.

If the extended synchronization word has not been detected after all rotation steps, the bits contained in the group of words Gm are not the first bits of the respective frames. The next group of words G(m+1) is then loaded into the shift register and tested.

This routine is performed every time a new bit is written into the memory. Bits arrive serially at a rate much slower than the operating frequency of a typical circuit for processing serial data. The rate of data reception may typically be 16,000 bits per second, while a processing circuit may operate with a clock frequency of several megahertz. Therefore, there is ample time between the arrival of two serial bits to achieve a full rotation of the shift register.

In practice, memory circuits can usually only be read and written to one word at a time. One aspect of the invention is to provide a method for reading and writing data one bit at a time. This may advantageously be combined with the rotation and searching of a group of words described above.

FIGS. 2A to 2E, in combination with FIG. 1 illustrate this method. A bit Bm$_p$, where p may be any integer from 1 to 8, of word Wm is due to be overwritten by an incoming bit.

Figure 2A:
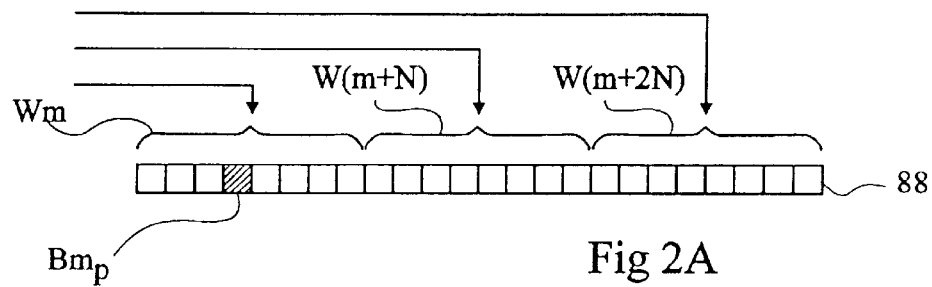
FIGS. 2A to 2E show steps of the method of the invention carried out with a shift register, while concurrently writing a received bit of data into the memory.

In FIG. 2A, words Wm, W(m+N), W(m+2N) are read into the shift register 88.

Figure 2B:
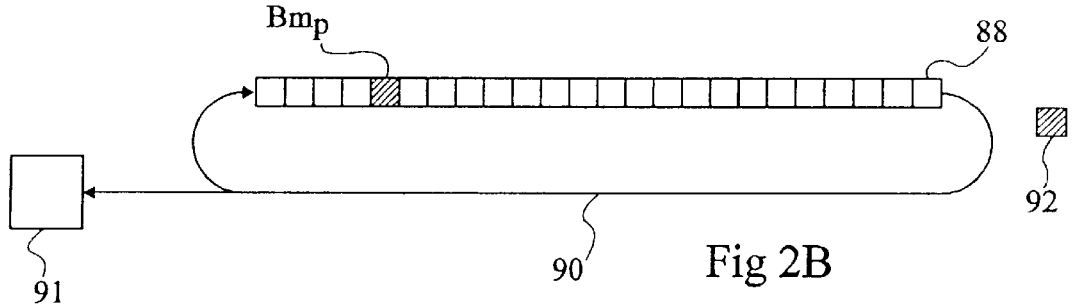

In FIG. 2B, the shift register is being operated in rotating mode, and the twenty four bit word formed in the shift register 88 is rotated. At each rotation, the last bit of the word in the shift register is written into the first bit of the word in the shift register through a feedback path 90 and is at the same time applied to a pattern recognition circuit 91, for example a finite state machine. An incoming bit 92 is held in a FIFO register, waiting to be written over bit Bm$_p$.

Figure 2C:
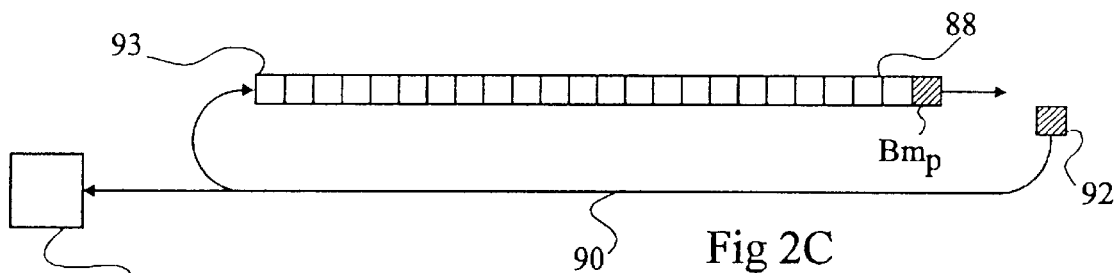

In FIG. 2C, when bit Bm$_p$ arrives at the end of the shift register 88, the mode of operation of the shift register is changed to the shifting mode so that instead of being fed back, the bit Bm$_p$ is lost, and replaced by the new bit 92 applied to the pattern recognition circuit and to the input 93 of the shift register 88.

Figure 2D:
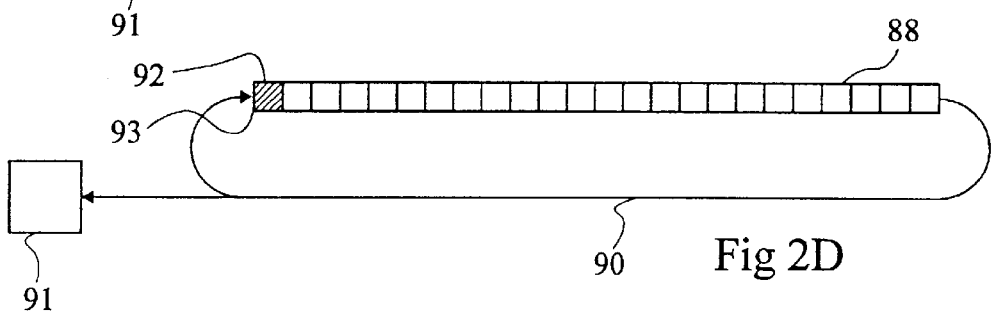

In FIG. 2D, the shift register then returns to the rotating mode of operation, rotating its contents until the new bit of data 92 is in the position formerly occupied by bit Bm$_p$.

Figure 2E:
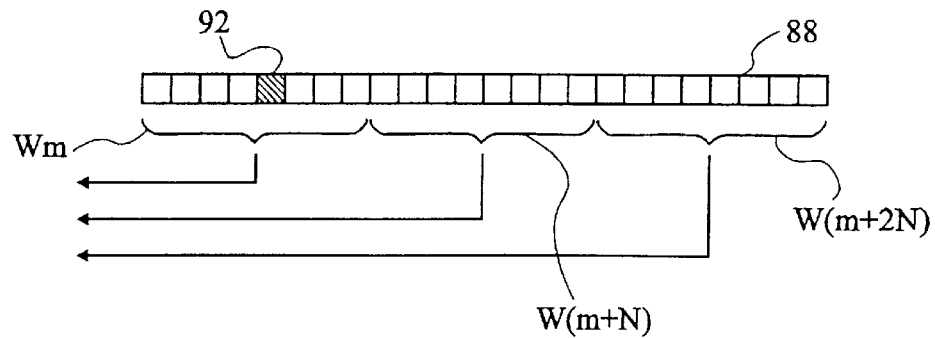

FIG. 2E shows this result. The data contained in the shift register is then written to memory as words Wm, W(m+N), W(m+2N). Thus, only the bit Bm$_p$ has been updated, effectively achieving a single bit write to memory.

The pattern recognition circuit 91 receives the bits contained in the shift register 88 as a sequence of bits during the rotation steps described. The pattern recognition circuit 91 is for example a finite state machine, designed to recognize the particular synchronization word searched for, setting a flag to indicate when the synchronization word is detected.

If the synchronization word is detected, the bits within words Wm, W(m+N), W(m+2N) mark the start of each respective frame. For example, the frame beginning with bit Bm$_p$ occupies each p'th bit of the words Wm to WN and each (p+1)'th bit of words W1 to W(m−1). The frame commencing with the eighth bit of word Wm includes each eighth bit of all words Wm to WN, and each first bit of words W(N+1) to W(N+m−1).

As the search for the synchronization word is performed at each bit arrival, the search is performed as soon as the first bit arrives, although no synchronization word is detectable until at least words WI, W(N+1), W(2N+1) have been filled.

For simplicity of addressing, the words Wm, W(m+N), W(m+2N), corresponding to a certain bit position within the frames, may be stored at consecutive addresses. This makes the reading and writing operations simpler. The words Wm, W(m+N), W(m+2N) are then stored as a burst of three consecutive words. The next three consecutive addresses contain words W(m+1), W(m+N+1), W(m+2N+1).

For reasons of cost, it is preferable to use a dynamic random access memory (DRAM). DRAMs are organized in pages, which consist of 512 eight bit words each. During addressing, the first time that a word in a particular page is addressed, the full address of that word must be given. This may consist of a nine bit page address plus a nine bit word address. Subsequent addressing of words within the same page requires only the nine bit word address to be supplied. This allows faster addressing of the words.

For this reason, it is preferred to arrange the memory storage such that words Wm, W(m+N), W(m+2N) in FIG. 1 are actually stored at consecutive memory addresses. This allows each read and write of these three words to be performed with only one page address plus three word addresses.

A problem is encountered in that the words to be read and written are organized in bursts of three. The pages in DRAM memory are arranged as pages of 512 words, which is not a multiple of three. If the last burst in the page had one or two words in the following page, the advantages of having only to address one page would be lost. For this reason, and according to an embodiment of the invention, each burst of words in DRAM is composed of four words. Three words are read and written to with the incoming serial data, as previously explained, and the unused.

Figure 3:
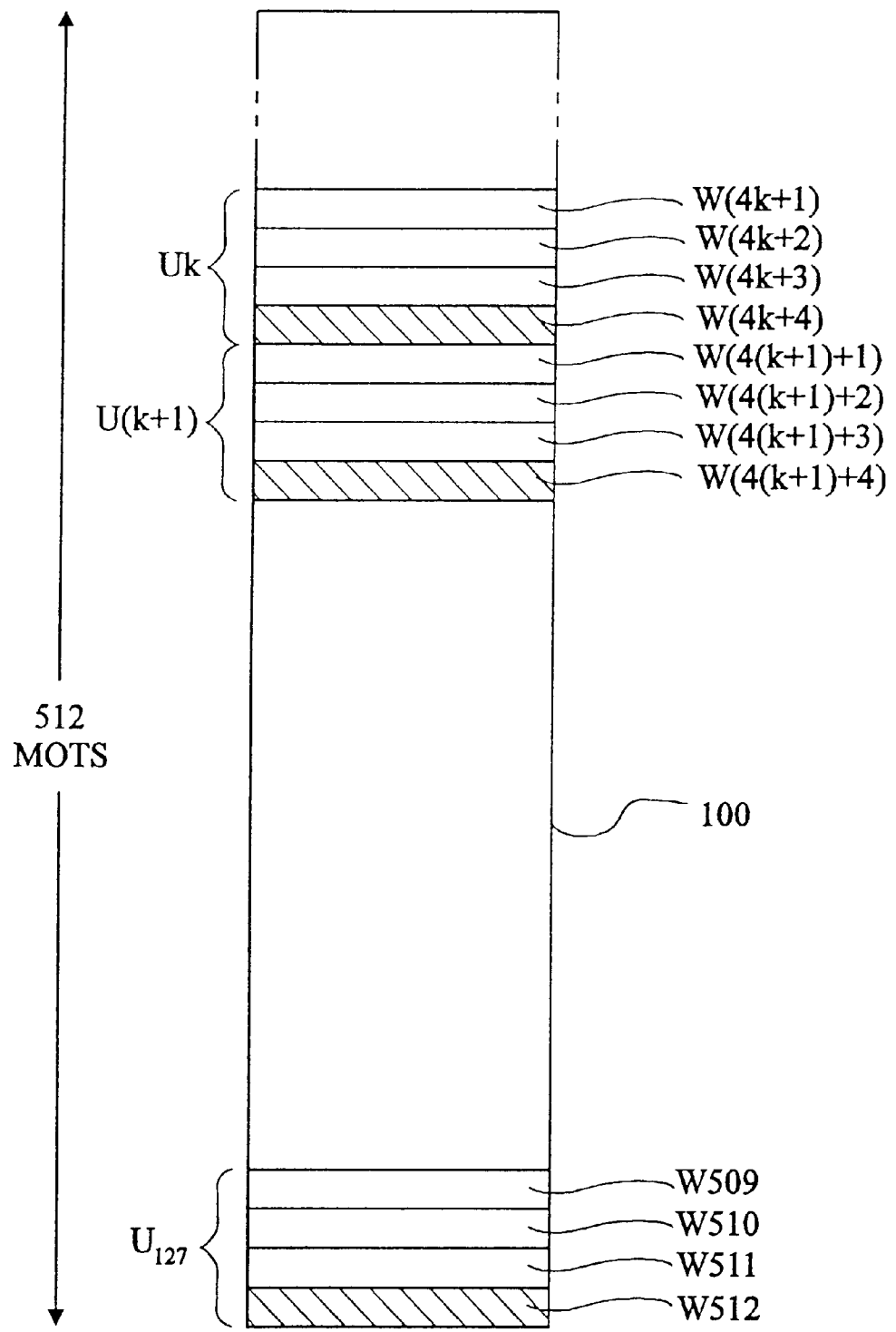
FIG. 3 shows an organization of a dynamic memory used according to the invention.

FIG. 3 illustrates this organization. A page 100 of memory contains a plurality of bursts Uk of words (where k is an integer from 0 to 127), each containing three consecutive words W(4k+1), W(4k+2), W(4k+3), which are used for storing data, plus one word W(4k+4) which is unused. The effect of this is to ensure that a page end coincides with the end of a burst of words, as 512 is a multiple of four. The proposed scheme of reduced page addressing may therefore be used.

The total memory requirement in this case is increased to four pages of 512 words, being 2K bytes rather than the 1.5K bytes actually required. This is not a drawback, because the circuit processing the frames usually has a great amount of memory, which it does not use before the synchronization is achieved. This memory is thus available for detecting the synchronization words according to the invention.

Figure 4:
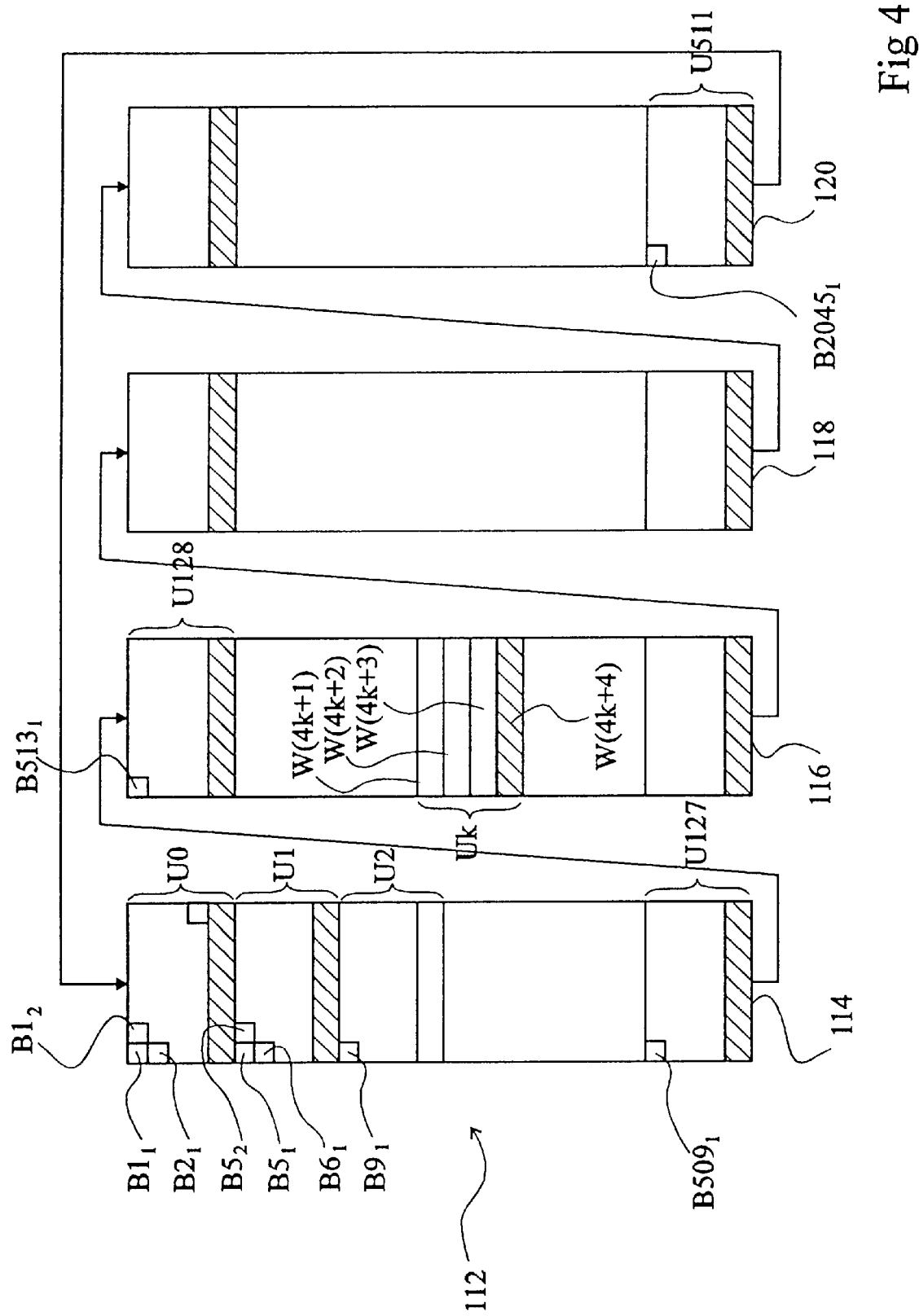
FIG. 4 shows a sequence of storage of data in a dynamic memory.

FIG. 4 illustrates the method of storing incoming serial data in a memory area 112 organized according to this embodiment of the invention. The memory area 112 is composed of four pages 114, 116, 118, 120, each containing 512 eight bit words. The pages are preferably, but not necessarily, arranged consecutively in memory. Each 512 word page contains 128 bursts Uk of words, each containing three words W(4k+1), W(4k+2), W(4k+3), which are used for storing data, plus one word W(4k+4) which is unused. Each burst may be regarded as a word of thirty two bits, of which only the first twenty four are used.

The first bit of data to arrive (not necessarily the first bit of a frame) is stored in the first bit location $B1_1$ of the first burst U0 in memory area 112. The second bit is stored in the first bit location $B5_1$ of the next burst U1; the third bit being stored in the first bit location $B9_1$ of the third burst U2, and so on until first bit location $B509_1$ in the last burst U127 of the first page 114 is filled with the 128th bit. The 129th bit is stored in the first bit location $B513_1$ of the first burst U128 of the second page 116. Memory is written to in a like manner until the 512th bit fills the first bit location $B2045_1$ of the last burst U511 in the memory area 112.

The next, 513th, bit is written in the second bit location $B1_2$ of the first burst U0 of memory area 112; the 514th bit being written in the second bit location $B5_2$ of the next burst U1.

The memory fills in a similar manner until, after 4,096 bits have been stored, the first word of each burst is full.

The 4,097th bit is stored in the first bit location $B2_1$ of the second word of the first burst U0. This may be considered the ninth bit of the burst. The 4,098th bit is stored in the ninth bit location $B6_1$ of the second burst U1.

The remaining locations of each burst fill in a like manner until, after 12,288 bits have been stored, the first twenty four locations of each burst are filled.

As the fourth word (bits 25 to 32) in each burst is to remain unused, the next, 12,289th bit is written to location $B1_1$, to overwrite the first data bit. Further incoming data overwrites the previously stored data in the same order as the previously stored data was written. Each burst contains 24 bits the same position in each of twenty four consecutive frames, plus one unused word of eight bits.

The searching for the synchronization word and the single bit memory writing are done in much the same manner as previously described, except that three consecutive data words W(4k+1), W(4k+2), W(4k+3) are loaded into the shift register 88, and rewritten from the shift register after shifting and replacing a bit with a new arriving bit. The fourth word of each burst is not loaded into the shift register.

Alternatively, four multiframes could have been stored, using all 32 bits of each burst with a 32 bit shift register to search for a 32 bit extended synchronization word.

Figure 5:
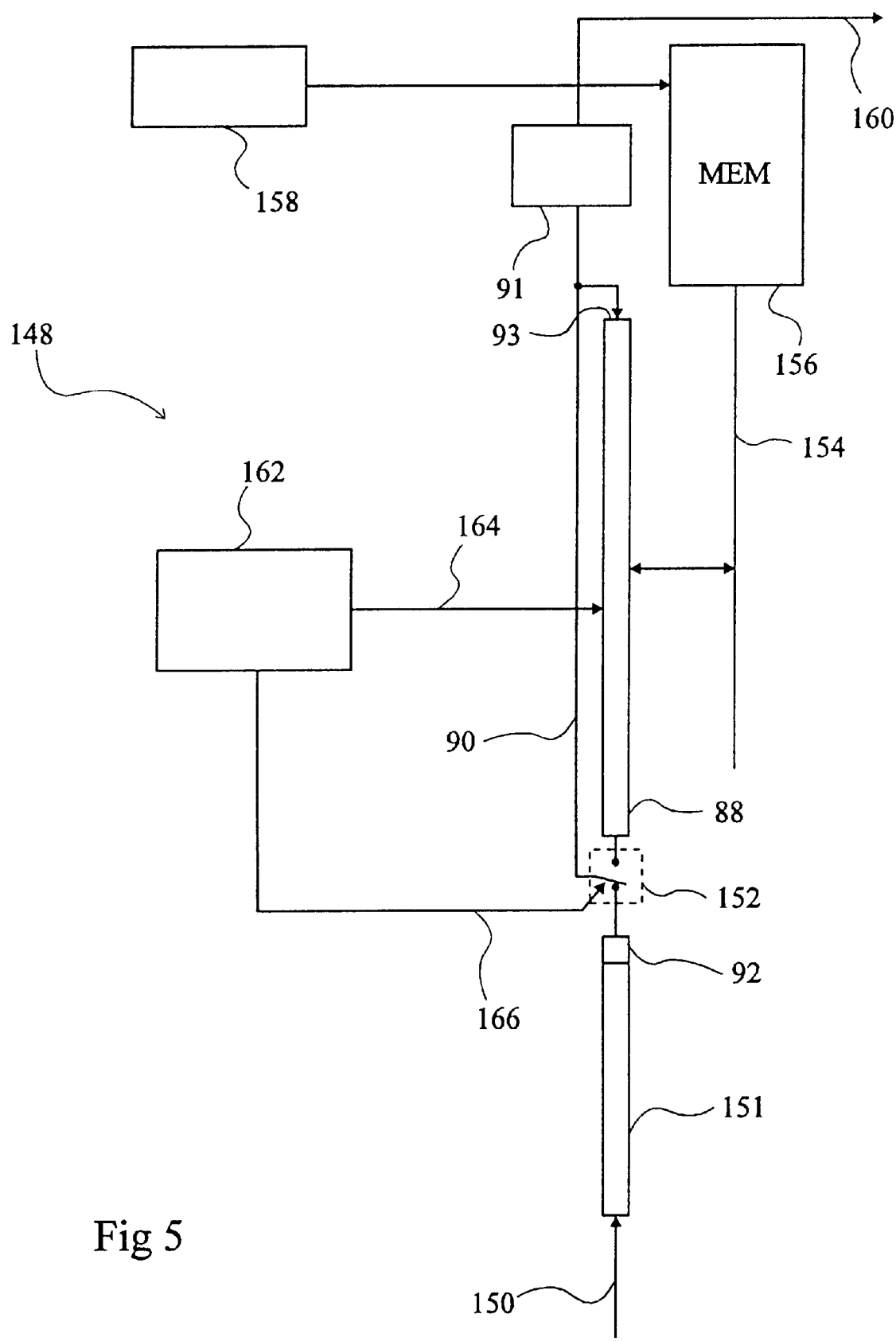
FIG. 5 shows a block diagram of an embodiment of a detection circuit according to the invention.

FIG. 5 shows a block diagram of an embodiment of a circuit 148 carrying out the method of the invention. The incoming serial data 150 is stored in a FIFO register 151. The output of this register is connected to one input of a switch 152. The switch 152 has a second input receiving the output of shift register 88 and has an output connected to the input 93 of the shift register. The shift register 88 is in communication with a data bus 154 connected to a memory 156. An addressing circuit 158 provides access addresses to the memory 156. The pattern recognition circuit 91 is connected to the input 93 of the shift register, and has an output 160 to external circuitry. Control circuitry 162 has a first output 164 which controls the shift register 88 and a second output 166 which controls the switch 152. A clock signal is also provided to the memory, register and control circuitry, but is omitted from the diagram for clarity.

The data arriving 150 is stored in the FIFO register 151. From there, it is transferred, one bit 92 at a time, into the shift register 88 and from there into the memory 156, according to the method described hereinbefore. This transfer is controlled by the control circuitry 162 and the memory addressing circuit 158. The groups of words Gm, Uk are loaded into the shift register 88 and rotated, the pattern detection circuit 91 searching for the synchronization word as the rotation progresses. If the synchronization word is recognized, the pattern recognition circuit 91 sets a flag to provide an output signal 160 indicating that the bits in the shift register are the synchronization bits of their respective frames. External circuitry, for example a microprocessor controlled system, may then read the required bits from the relevant locations in the memory 156.

Figure 6:
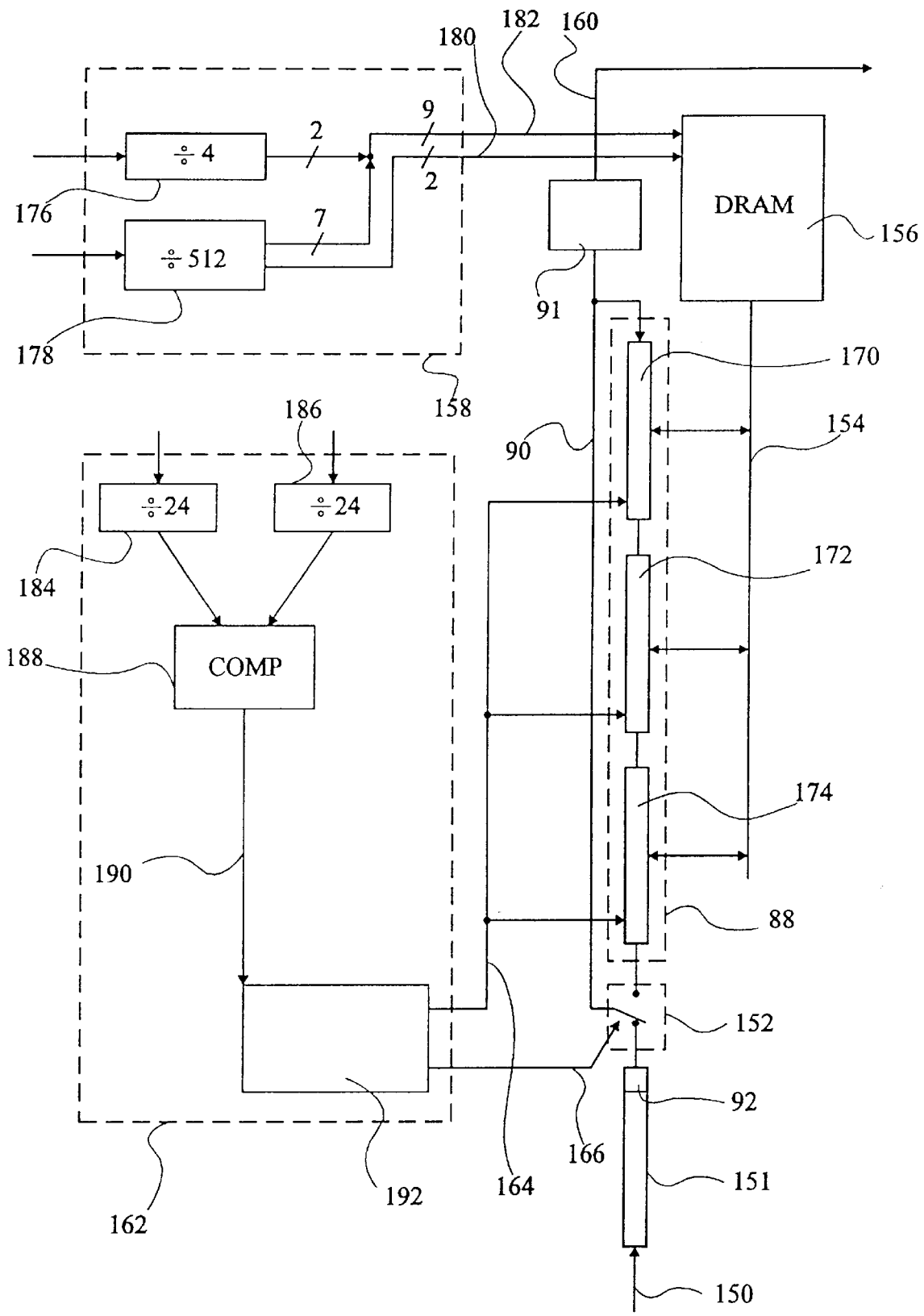
FIG. 6 shows a detailed block diagram of the circuit of FIG. 5.

FIG. 6 shows a more detailed block diagram of the circuitry of FIG. 5. The memory device 156 is a DRAM device. The shift register 88 is composed of a series of three eight bit shift registers 170, 172, 174. The shift register feedback path 90, the pattern detection circuit 91 and its output 160, the FIFO register 151, the data input 150, the memory data bus 154, the switch 152 and its control input signal 166 are as previously described.

The memory addressing circuit 158 comprises two counter circuits 176, 178. Counter 178 is a nine bit (divide by 512) counter. The two most significant bits of its output supply the page addresses 180 to the memory 156. The seven least significant bits of its output supply bits 8 to 2 of the word address 182, the counter 176, which is a two bit (divide by 4) counter, supplying bits 1 and 0 of the word address 182. These two counters are driven by clock signals such that counter 176 is incremented four times as each burst of words Uk is read into the shift register 88, and is incremented a further four times as the contents of the shift register 88 are written back into the memory 156. Counter 178 is incremented by one after each writing of a burst Uk to memory 156 is complete. Hence, the divide-by-four counter 176 counts the current multiframe, and determines which word of the current burst is to be selected. The divide-by-512 counter counts the current bit, and selects the correct burst from the 512 available bursts, spread over four pages of memory.

The shift register control circuitry 162 comprises two divide-by-24 counters 184, 186 whose outputs are connected to a comparator 188. The comparator 188 supplies a signal 190 to logic circuitry 192 which generates control a signal 164 of the shift registers 170, 172, 174 and a control signal 166 of the switch 152.

The two divide-by-24 counters 184, 186 are driven by clock signals such that the first counter 184 is incremented once for each 512 bits received, and the second counter 186 is incremented each time a rotation or shift is performed by the shift register 88.

The first counter 184 therefore counts the frame currently arriving on the input 150. The second counter 186 counts the number of shifts that have been performed on the bits held in the shift register 88. The comparator 188 emits a signal 190 when the two counters hold equal values. At this time, a signal is supplied by logic circuitry 192 to the switch 152, and the bit 92 in the FIFO register 151 is admitted to the input 93 of the shift register at the next shift command 164. Depending on the direction of the rotation performed on the contents of the shift register, one of the 24 bit counters may be a down-counter.

Although the invention has been described with reference to a number of specific embodiments, the invention is not limited to these specific embodiments. In particular, the use of pages in memory may be generalized such that any page which contains a number of bits which is not a multiple of the synchronization word length l, but which is a multiple of (l+j), is organized as bursts each containing l used bits and j unused bits. Variable synchronization words may be detected by storing the searched synchronization word in a register and replacing the finite state machine in the pattern detector circuit 91 with a comparator which compares the contents of the shift register 88 with the stored synchronization word. Synchronization words of lengths other than eight bits may be detected, and in groups of other than three multiframes. The word length of the memory may be other than the number of frames in a multiframe, provided that the total word length used in the shift register 88 equals a multiple of the number of words in a multiframe. The bits of the synchronization word may be at bit locations other than the first in each frame.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A circuit for detecting a synchronization word having l bits in a stream of bits having a plurality of frames, each of the frames having a synchronization bit, the circuit comprising:

a memory that stores bits in groups of l bits, each group of l bits containing one bit from each of l consecutive frames, wherein the memory includes a plurality of pages each having a predetermined number of bit locations, which is not a multiple of l, and wherein the memory stores bits in groups of l+j bits, j representing a number of unused bit locations of the predetermined number of bit locations and being selected such that the predetermined number of bit locations is a multiple of l+j, each of the groups of bits comprising a number of words at consecutive addresses on one of the pages of the plurality of pages;

shift register coupled to the memory to receive a selected group of the groups of l bits; and a comparator, coupled to the shift register, that compares the selected group of l bits with a predetermined synchronization word.

2. The circuit of claim 1, wherein the shift register is constructed and arranged to replace one of the bits of the selected group with an updated bit to create an updated selected group.

3. The circuit of claim 2, further comprising a memory control circuit, coupled to the shift register, that replaces the selected group in the memory with the updated selected group.

4. A circuit for detecting a synchronization word having l bits in a stream of bits having a plurality of frames, each of the frames having a synchronization bit, the circuit comprising:

means for storing bits in groups of l bits, each group of l bits containing one bit from each of l consecutive frames, wherein the means for storing includes a plurality of pages each having a predetermined number of bit locations, which is not a multiple of l, and wherein the means for storing stores bits in groups of l+j bits, j representing a number of unused bit locations of the predetermined number of bit locations and being selected such that the predetermined number of bit locations is a multiple of l+j, each of the groups of bits comprising a number of words at consecutive addresses on one of the pages of the plurality of pages;

a shift register coupled to the means for storing to receive a selected group of the groups of l bits; and a comparator, coupled to the shift register, that compares the selected group of l bits with a predetermined synchronization word.

5. The circuit of claim 4, further comprising means for replacing one of the bits of the selected group with an updated bit to create an updated selected group.

6. The circuit of claim 5, further comprising means for replacing the selected group in the memory with the updated selected group.

* * * * *